Nov. 23, 1926.
W. COOPER
ANIMAL TRAP
Filed April 27, 1926
1,607,872
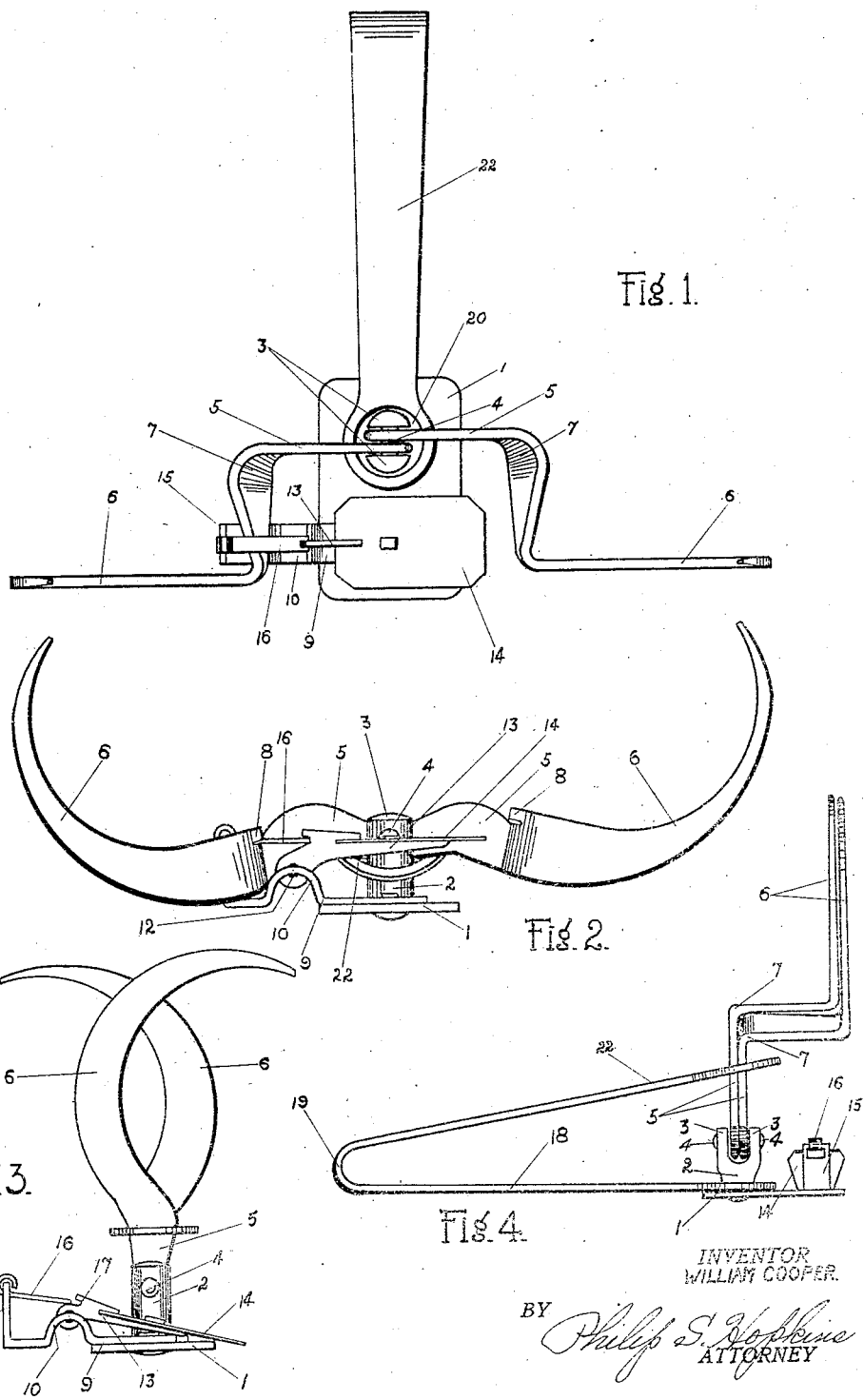
INVENTOR
WILLIAM COOPER.
BY Philip S. Hopkins
ATTORNEY Patented Nov. 23, 1926.

1,607,872

UNITED STATES PATENT OFFICE.

WILLIAM COOPER, OF APALACHIN, NEW YORK, ASSIGNOR, BY DIRECT AND MESNE ASSIGNMENTS, OF ONE-THIRD TO C. P. STROUD, OF BINGHAMTON, NEW YORK, AND ONE-THIRD TO ARTHUR S. REDPATH, OF UNION, NEW YORK.

ANIMAL TRAP.

Application filed April 27, 1926. Serial No. 104,942.

This invention relates to traps for animals and particularly to that type of trap which compels the instant death of the animal caught.

Heretofore, in traps of this general character, the trigger mechanism for releasing the jaws of the trap has been so placed with respect to such jaws as to permit possibility of an animal releasing or setting off the trap without being caught or by simply catching its foot or leg, which would either permit the animal to escape or suffer torture until released.

The seriousness of such contingency is generally recognized, and in fact legislation has been proposed and in some instances passed prohibiting traps of such character.

It is the object of my invention therefore to construct a trap which is so arranged that when it is sprung, the animal will be readily and fairly caught about the body or neck, thus bringing almost instantaneous death.

Another feature of my invention lies in the fact that I have so constructed and arranged the parts as to make the trap operative as above described, regardless of whether the animal approaches it and springs it from any accessible direction. This is a decided improvement over former traps wherein it is necessary for the animal to approach and spring the trap from the front only.

Other objects and advantages in details of construction and operation will be apparent as the description proceeds, reference being had to the accompanying drawing wherein like reference numerals indicate like parts.

In the drawing:—

Figure 1 is a top plan view of the trap in its set or open position.

Figure 2 is a front end view thereof.

Figure 3 is a front end view of the trap sprung.

Figure 4 is a side view of the trap in its sprung position.

In carrying out my invention, I provide a base plate 1 on which is rigidly supported, as by riveting or other suitable means, a post 2, the upper end of which is bifurcated to form the supporting arms 3. A pin or pintle 4 is secured between the arms 3 adjacent the upper end of the post, and pivotally mounted on this pintle 4 are the lower ends 5 of the trap jaws 6.

As clearly indicated in Figure 1, these jaws 6 are offset as at 7, slightly above the pivoted ends 5 and then again turned parallel to such ends 5, thus substantially spacing the body of the jaws 6 from their pivotal points. The jaws 6 may be scored or provided with the tongues 8 at the points of bending to provide an additional weapon in attacking or embracing the animal.

Also secured to the base 1, as by rivets or other suitable means, is a laterally extending bracket 9 overhanging the side edge of the base. As shown clearly in Figure 2, this bracket 9, at a point adjacent the edge of the base, is bent upwardly as at 10, said upwardly turned portion being recessed on its top to provide a pintle 12 to which is pivoted one end of a trigger plate support 13 extending laterally across the base 1 and supporting on its top the trigger plate 14 rigidly secured thereto. It will be noted that such construction brings the trigger plate 14 substantially in the same plane with the bodies of the jaws 6.

The extreme outer end of the supporting bracket 9 is turned upwardly to a height substantially the same as that of the post 2, as at 15, and to the upper end of this extension is pivoted the trigger lever or arm 16 adapted to engage over the offset portion of one of the jaws 6 when the same are turned downwardly to their open position as shown in Figures 1 and 2. The inner free end of the trigger lever 16 is adapted to engage within the notch 17 cut in the supporting member 13 whereby when said trigger lever 16 is forced upwardly under tension, said trigger plate 14 will be held in its uppermost position as illustrated clearly in Figure 2.

A heavy spring 18, preferably of flat material, is bent upon itself as at 19 and is provided at its ends with the openings 20 encircling the post 1, and rotatable with relation thereto. Both ends of the spring 18 encircle the post 2 when the spring is compressed as in Figure 1, the upper arm 22 of the spring engaging with the inner ends 5 of the jaws 6 and normally tending to close said jaws, thus providing the required tension for maintaining the trigger arm and trigger plate in set position. Obviously, if, with the trap in the position shown in Figure 1, the trigger plate 14 is depressed, the trigger lever 16 will be released from its notch 17, thus releasing the jaws 6, and permitting the tension of the spring 18 in expanding to instantly and forcibly close the jaws 6 to the position shown in Figure 3. The spring 18 is of course of very heavy spring material and its action in closing the jaws 6 is almost instantaneous.

From the foregoing, it will be observed that I have provided a trap which is so constructed that an animal may walk into it from any direction, and so arranged that when the animal steps on the trigger plate 14, it will of necessity be in such position as to receive the full force of the jaws of the trap about its neck or body. The offset portions 7 of the jaws permit the animal to walk into the trap from the rear or from either side and the placing of the trigger plate substantially in the plane of the jaws, offset as they are, insures the extinction of the animal once it trips the trigger plate 14.

The jaws 6 may, of course, take any desired shape or form, but are preferably curved as illustrated in the drawing, in order to more forcibly encounter and embrace the body of the animal.

Many changes in details of construction and arrangement may, of course, be made without departing from the scope of my invention. I do not limit myself therefore to the exact modification shown, other than by the appended claims.

I claim:—

1. A trap comprising a pair of jaws pivoted to a common pintle, said jaws being offset adjacent their pivoted ends whereby the body of said jaws lies in a plane parallel to but apart from the pivoted ends thereof, a spring normally forcing said jaws together, a trigger plate lying in substantially the same plane with the body of said jaws, and a trigger arm adapted to overlie the offset portion of one of said jaws and engage said plate.

2. A trap comprising a base, a fixed post on one end thereof, a pair of jaws pivoted at one end to said post, said jaws being offset laterally adjacent said post whereby the body of said jaws lies in a plane parallel to but apart from said pivoted ends, a supporting member on said base in substantially the same plane as the body of said jaws, a trigger plate pivoted to said support, a trigger arm also pivoted to said support and adapted to extend over the offset portion of one of said jaws and engage said plate, and a spring encircling said post and engaging the pivoted ends of said jaws for normally forcing them together.

WILLIAM COOPER.